(12) United States Patent
Okada et al.

(10) Patent No.: US 8,195,019 B2
(45) Date of Patent: Jun. 5, 2012

(54) PLASTIC GLASS OPTICAL FIBER

(75) Inventors: Kenji Okada, Sakura (JP); Naritoshi Yamada, Sakura (JP); Shoichiro Matsuo, Sakura (JP)

(73) Assignee: Fujikura Ltd., Tokyo (JP)

( * ) Notice: Subject to any disclaimer, the term of this patent is extended or adjusted under 35 U.S.C. 154(b) by 225 days.

(21) Appl. No.: 12/648,021

(22) Filed: Dec. 28, 2009

(65) Prior Publication Data

US 2010/0104249 A1   Apr. 29, 2010

Related U.S. Application Data

(63) Continuation of application No. PCT/JP2007/070078, filed on Oct. 15, 2007.

(30) Foreign Application Priority Data

Jun. 26, 2007 (JP) ................................. 2007-167488

(51) Int. Cl.
    *G02B 6/36* (2006.01)
(52) U.S. Cl. .................................................... 385/127
(58) Field of Classification Search ................ None
    See application file for complete search history.

(56) References Cited

U.S. PATENT DOCUMENTS 6,078,715 A    6/2000 Fujii et al.
6,222,972 B1 * 4/2001 Yamamoto et al. ........... 385/127

FOREIGN PATENT DOCUMENTS

| EP | 0883001 A1 | 12/1998 |
|----|------------|---------|
| EP | 1 022 592 A1 | 7/2000 |
| JP | 8-122542 A | 5/1996 |
| JP | 8-304638 A | 11/1996 |
| JP | 9-222526 A | 8/1997 |
| JP | 10-160947 A | 6/1998 |
| JP | 2794710 B2 | 9/1998 |
| JP | 10-282353 A | 10/1998 |
| JP | 2836069 B2 | 12/1998 |
| JP | 11-064665 A | 3/1999 |
| JP | 2000-214342 A | 8/2000 |
| JP | 3446208 B2 | 9/2003 |
| JP | 2005-321686 A | 11/2005 |

OTHER PUBLICATIONS

Extended European search report dated Aug. 23, 2011 in counterpart European Patent Application No. 07829812.2.

* cited by examiner

*Primary Examiner* — Michelle R Connelly Cushwa
(74) *Attorney, Agent, or Firm* — Sughrue Mion, PLLC

(57) ABSTRACT

A plastic glass optical fiber includes a glass core (diameter $a_1$, relative refractive index difference $\Delta_1$, and refractive index $n_1$), a polymer core (diameter $a_2$, relative refractive index difference $\Delta_2$, and refractive index $n_2$), and a polymer cladding (refractive index $n_3$), in which the diameter $a_1$ of the glass core is within a range of 110 μm to 200 μm, a parameter X (X is $a_2^2/a_1^2$) is within a range of $1.15 \leq X \leq 2.9$, a parameter Y (Y is $\Delta_2/\Delta_1$) is within a range of $0.25 \leq Y \leq 0.84X - 0.68$ (when $1.15 \leq X \leq 2$) or $0.48X - 0.71 \leq Y \leq -(2/9)X + 13/9$ (when $2 \leq X \leq 2.9$), a parameter $Z_R$ ($Z_R$ is $Z_{2core}/Z_{1core}$; $Z_{2core} = a_2^2 \pi/4 \times \sqrt{(n_1^2 - n_3^2)}$ and $Z_{1core} = a_1^2 \pi/4 \times \sqrt{(n_1^2 - n_2^2)}$) is within a range of $1.25 \leq Z_R \leq 4$.

8 Claims, 1 Drawing Sheet

PLASTIC GLASS OPTICAL FIBER

TECHNICAL FIELD

The present invention relates to a plastic glass optical fiber which has a glass core and a plastic cladding.

BACKGROUND ART

A plastic optical fiber (hereinafter "POF") or a plastic clad fiber (hereinafter "PCF") is proposed as an optical fiber which is used primarily in a short-range optical communication such as home LAN, office LAN, vehicle-mounted communication systems, and the like. Among them, both core and cladding of the POF are composed of plastic such as PMMA (polymethylmethacrylate) resin, and the like. The core of the PCF is composed of silica glass, and the cladding of the PCF is composed of polymer resin. The refractive index distribution of the core of those optical fibers is a step-type refractive index distribution in which the refractive index is constant within the core. As advantages of using the step-type refractive index distribution, it is possible to manufacture a core preform with a uniform refraction index at a low price, because it is possible to manufacture the core preform without adding additives such as germanium to the silica glass when manufacturing the core preform.

Patent Document 1 disclosed the POF. Patent Document 2 to Patent Document 4 disclosed the PCF.

The important parameters of an optical fiber include core diameter and numerical aperture (hereinafter "NA") which are indicators of the ease of light-source coupling, as well as bandwidth which indicates transmission capacity. However, in the step-type optical fiber which is ordinarily composed of a single core and cladding, the NA and the bandwidth have an inverse relationship, such that it is necessary to narrow bandwith in order to enlarge NA, and reduce NA in order to widen bandwidth. When NA is reduced, the efficiency of coupling with a light source is lowered.

Ordinarily, the bandwidth of a multi-mode optical fiber primarily originates in intermodal dispersion. The intermodal dispersion is expressed by the group delay time difference (Differential Group Delay) between modes, and maximum intermodal dispersion is the difference between the mode where the group delay time difference is quickest and the mode where it is slowest (maximum group delay time difference). Generally, in the case of an one-step core structure which has a step-type refractive index distribution, the mode number is dependent only on NA or the relative refractive index difference (hereinafter $\Delta$), and the quickest mode becomes the fundamental mode, and the slowest mode becomes the highest-order mode. Accordingly, in order to enhance bandwidth, it is necessary to reduce NA (or $\Delta$) as mentioned above. However, as NA (or $\Delta$) is not dependent on the core diameter, it is possible to select a desired core diameter without reference to the setting of NA (or $\Delta$).

Generally, $\Delta$ and NA are expressed by the following formulae.

$$\Delta = \frac{n_1^2 - n_2^2}{2n_1^2} \quad \text{(Formula 1)}$$

$$NA = n_1\sqrt{2\Delta} \quad \text{(Formula 2)}$$

Here, $n_1$ represents the refractive index of the core, and $n_2$ represents the refractive index of the cladding.

In order to solve such problems, the following has been proposed: to give the refractive index distribution of the core an $\alpha$-power distribution (Patent Documents 5 and 6); multi-step core fiber composed of multiple cores with different refractive indices (Patent Document 7); two-step core fiber (Patent Document 8); and the like.

Patent Document 1: Japanese Unexamined Patent Application, First Publication No. H08-122542

Patent Document 2: Japanese Patent Granted Publication No. 2794710

Patent Document 3: Japanese Patent Granted Publication No. 2836069

Patent Document 4: Japanese Patent Granted Publication No. 3446208

Patent Document 5: Japanese Unexamined Patent Application, First Publication No. H08-304638

Patent Document 6: Japanese Unexamined Patent Application, First Publication No. 2000-214342

Patent Document 7: Japanese Unexamined Patent Application, First Publication No. 2005-321686

Patent Document 8: Japanese Unexamined Patent Application, First Publication No. H10-282353

DISCLOSURE OF THE INVENTION

Problems to be Solved by the Invention

In the case of one-step core PCF fiber which has a step-type refractive index distribution, the core diameter can be increased if A satisfies bandwidth, but as the ease of bending (flexibility) of fiber decreases when core diameter (i.e., glass diameter) increases, the probability of breakage relative to bending increases. Consequently, there are limitations on the core diameter from the standpoint of life.

On the other hand, manufacturing conditions are made more complex when the refractive index distribution of the core is given an $\alpha$-power distribution and when manufacturing a multi-step core fiber. Consequently, manufacturing costs increase, resulting in loss of the essential advantage of enabling inexpensive manufacture of optical fiber.

As a method to solve the aforementioned problems, optical fiber with a two-step core structure is proposed in Patent Document 8. In the case of the optical fiber with the two-step core, in contrast to a one-step core, the refractive index of the $2^{nd}$ core is ordinarily lower than that of the $1^{st}$ core. Consequently, the mode that determines (triggers) the maximum value of intermodal dispersion varies due to the interrelationships of $1^{st}$ core diameter ($a_1$) and $2^{nd}$ core diameter ($a_2$) and of $1^{st}$ relative refractive index difference ($\Delta_1$) and $2^{nd}$ relative refractive index difference ($\Delta_2$) (in the case of a one-step core structure, this would correspond to fundamental mode and highest-order mode).

In the aforementioned patent document, a two-step core structure is employed which is composed of a silica glass core and a polymer resin core as well as resin cladding, and the ratio of $1^{st}$ core diameter and $2^{nd}$ core diameter, the ratio of the refractive index differences of the first core and the second core, and their interrelationships are prescribed. However, even under the conditions disclosed in this document, bandwidth may narrow compared to the case of a single-layer core, and even if it has effect, they are unable to make the bandwidth sufficiently wide, as only a 20 percent larger bandwidth is obtained compared to that of a one-step core. Moreover, no reference is made to NA, core diameter, or flexural resistance in the aforementioned patent document.

Recently, demand has grown for a large-diameter optical fiber with high NA for the purpose of enhancing light-source coupling efficiency even when the bandwidth is identical to that of one-step core.

The present invention was made in consideration of the above circumstances, and aims to provide a plastic glass optical fiber which has a bandwidth equal to or greater than that of a one-step core fiber, and which improves flexural resistance and achieves large diameter and high NA.

Means for Solving the Problems

In order to solve the aforementioned problems, the present invention provides a plastic glass optical fiber includes a glass core composed of glass; a polymer core composed of fluorine addition polymer, which is disposed around a periphery of the glass core, and has a refractive index lower than a refractive index of the glass core; and a polymer cladding composed of polymer, which is disposed around a periphery of the polymer core, and has a refractive index lower than the refractive index of the polymer core, wherein the plastic glass optical fiber satisfies following relations:

a diameter $a_1$ of the glass core is within a range between 110 μm or more and 200 μm or less, and when the diameter of the glass core is set to be $a_1$ and a diameter of the polymer core is set to be $a_2$, a parameter X defined as $X = a_2^2/a_1^2$ is within a range of $1.15 \leq X \leq 2.9$;

when a relative refractive index difference between the glass core and the polymer core is set to be $\Delta_1$ and a relative refractive index difference between the polymer core and the polymer cladding is set to be $\Delta_2$, a parameter Y defined as $Y = \Delta_2/\Delta_1$ is within a range of $0.25 \leq Y \leq 0.84X - 0.68$ when the parameter X is within a range of $1.15 \leq X \leq 2$, and the parameter Y is within a range of $0.48X - 0.71 \leq Y \leq -(2/9)X + 13/9$ when the parameter X is within a range of $2 \leq X \leq 2.9$; and when the diameter of the polymer core is set to be $a_2$, the refractive index of the glass core is set to be $n_1$, the refractive index of the polymer core is set to be $n_2$, and the refractive index of the polymer cladding is set to be $n_3$, a ratio $Z_R = Z_{2core}/Z_{1core}$ of parameters $Z_{2core}$ and $Z_{1core}$ is within a range of $1.25 \leq Z_R \leq 4$, in which the parameter $Z_{2core}$ is defined as $Z_{2core} = a_2^2 \pi/4 \times \sqrt{(n_1^2 - n_3^2)}$ and the parameter $Z_{1core}$ is defined as $Z_{1core} = a_1^2 \pi/4 \times \sqrt{(n_1^2 - n_2^2)}$.

With respect to the optical fiber of the present invention, it is preferable that the relative refractive index difference $\Delta_1$ between the aforementioned glass core and the polymer core be 1.2% or less. It is preferable that the aforementioned parameter X be 1.8 or more. It is preferable that the aforementioned parameter Y be equal to 1. In addition, it is preferable that a thickness of the aforementioned polymer core defined as $(a_2 - a_1)/2$ be 10 μm or greater.

Effects of the Invention

According to the present invention, it is possible to provide an optical fiber which has a bandwidth equal to or greater than that of one-step core fiber, and which improves flexural resistance and achieves large diameter and high NA.

DESCRIPTION OF REFERENCE NUMERALS

| | |
|---|---|
| $a_1$ | diameter of glass core |
| $a_2$ | diameter of polymer core |
| $n_1$ | refractive index of glass core |
| $n_2$ | refractive index of polymer core |
| $n_3$ | refractive index of polymer cladding |
| $\Delta_1$ | relative refractive index difference between glass core and polymer core |
| $\Delta_2$ | relative refractive index difference between polymer core and polymer cladding |

BEST MODE FOR CARRYING OUT THE INVENTION

The present invention will be described below, based on the preferred embodiments with reference to drawings.

Figure 1:
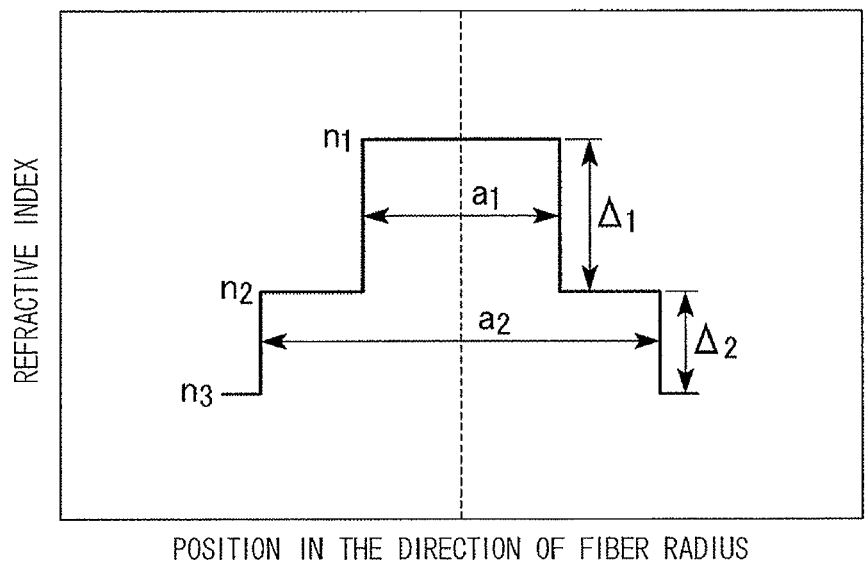
FIG. 1 is a schematic configuration view which shows the refractive index distribution of the optical fiber according to an embodiment of the present invention.

FIG. 1 schematically shows the refractive index distribution of the optical fiber of the present embodiment. The optical fiber of the present invention includes a glass core composed of glass; a polymer core composed of fluorine addition polymer (fluorine-containing polymer) that is disposed around the periphery of the glass core and that has a refractive index lower than that of the glass core; and polymer cladding composed of polymer that is disposed around the periphery of the polymer core and that has a refractive index lower than that of the polymer core.

The glass core of the optical fiber of the present invention can be composed of silica glass, silica-based glass that includes additives such as germanium in silica glass, multi-component glass, and so on. Among these, it is preferable that the glass core (i.e., the silica core) is composed of silica glass without additives, as this enables the core to be inexpensively configured with a uniform refractive index.

As the fluorine addition polymer which configures the polymer core, any of the fluorine addition polymers that are conventionally used in PCF may be appropriately selected for use.

The polymer which configures the polymer cladding may be appropriately selected from all polymers including the fluorine addition polymers that are conventionally used in PCF. It is preferable to use fluorine addition polymers for the polymer cladding.

In FIG. 1, $a_1$ is a diameter of the glass core, $a_2$ is a diameter of the polymer core, $n_1$ is a refractive index of the glass core, $n_2$ is a refractive index of the polymer core, $n_3$ is a refractive index of the polymer cladding, $\Delta_1$ is a relative refractive index difference between the glass core and the polymer core, and $\Delta_2$ is a relative refractive index difference between the polymer core and the polymer cladding.

Here, in a manner similar to the aforementioned definitional identity of $\Delta$, the relative refractive index differences $\Delta_1$ and $\Delta_2$ are defined by the following formulae.

$$\Delta_1 = \frac{n_1^2 - n_2^2}{2n_1^2} \quad \text{(Formula 3)}$$

-continued $$\Delta_2 = \frac{n_2^2 - n_3^2}{2n_2^2} \quad \text{(Formula 4)}$$

In these formulae, $n_1$ indicates a refractive index of the glass core, $n_2$ indicates a refractive index of the polymer core, and $n_3$ indicates a refractive index of the polymer cladding, and these satisfy the relation of $n_1 > n_2 > n_3$.

As a result of being studied by the inventors of the present invention, an optimal relation was discovered which enables NA to be increased while maintaining transmission bandwidth, and enables the core diameters $a_1$ and $a_2$ to be maximally enlarged even under such conditions, by appropriately adjusting the aforementioned parameters of $a_1$, $a_2$, $\Delta_1$ and $\Delta_2$. Hereinafter, it will be concretely described.

The optical fiber of the present invention satisfies the following relations: the aforementioned diameter $a_1$ of the glass core is within a range between 110 μm or more and 200 μm or less;

when the diameter of the glass core is set to be $a_1$ and a diameter of the polymer core is set to be $a_2$, a parameter X defined as $X = a_2^2/a_1^2$ is within a range of $1.15 \leq X \leq 2.9$;

when a relative refractive index difference between the glass core and the polymer core is set to be $\Delta_1$ and a relative refractive index difference between the polymer core and the polymer cladding is set to be $\Delta_2$, a parameter Y defined as $Y = \Delta_2/\Delta_1$ is within a range of $0.25 \leq Y \leq 0.84X - 0.68$ when the parameter X is within a range of $1.15 \leq X \leq 2$, and is within a range of $0.48X - 0.71 \leq Y \leq (2/9)X + 13/9$ when the parameter X is within a range of $2 \leq X \leq 2.9$, relative to the parameter X; and when a diameter of the polymer core is set to be $a_2$, a refractive index of the glass core is set to be $n_1$, a refractive index of the polymer core is set to be $n_2$, and a refractive index of the polymer cladding is set to be $n_3$, a ratio $Z_R = Z_{2core}/Z_{1core}$ of parameters $Z_{2core}$ and $Z_{1core}$ is within a range of $1.25 \leq Z_R \leq 4$, in which the parameter $Z_{1core}$ is defined as $Z_{2core} = a_2^2 \pi/4 \times \sqrt{(n_1^2 - n_3^2)}$ and the parameter $Z_{1core}$ is defined as $Z_{2core} = a_2^2 \pi/4 \times \sqrt{(n_1^2 - n_2^2)}$.

The aforementioned parameters X and Y are defined by the following formulae.

$$X = \frac{a_2^2}{a_1^2} \quad \text{(Formula 5)}$$

$$Y = \frac{\Delta_2}{\Delta_1} \quad \text{(Formula 6)}$$

With respect to the optical fiber of the present invention, the parameter X defined as $X = a_2^2/a_1^2$ is within a range of $1.15 \leq X \leq 2.9$. When the parameter X is outside this range, the bandwidth value is equal to or less than that of the single-layer core, and the effects sought from a two-layer core are not manifested.

It is more preferable that the parameter X is set to be 1.8 or more. That is, when it is within a range of $1.8 \leq X \leq 2.9$, the aforementioned parameter Z is doubled or more than doubled compared to the case of the single-layer core, thereby enabling obtainment of a sufficiently high coupling effect with the light source (light-source coupling efficiency).

As the machining accuracy required by the connector becomes roughened when coupling efficiency is high, there is the advantage that machining costs are reduced, and the overall system can be inexpensively constructed.

Furthermore, in the optical fiber of the present invention, the parameter Y defined as $Y = \Delta_2/\Delta_1$ satisfies the following relations (i) and (ii) relative to the parameter X.

$$0.25 \leq Y \leq 0.84X - 0.68, \text{ when } 1.15 \leq X \leq 2 \quad \text{(i)}$$

$$0.48X - 0.71 \leq Y \leq -(2/9)X + 13/9, \text{ when } 2 \leq X \leq 2.9 \quad \text{(ii)}$$

As a result of the satisfaction of the aforementioned relations by the parameters X and Y, it is possible to obtain an optical fiber under all conditions within these ranges such that the optical fiber with a two-layer core structure has better bandwidth, NA and core diameter than in the case of a single-layer core.

Figure 2:
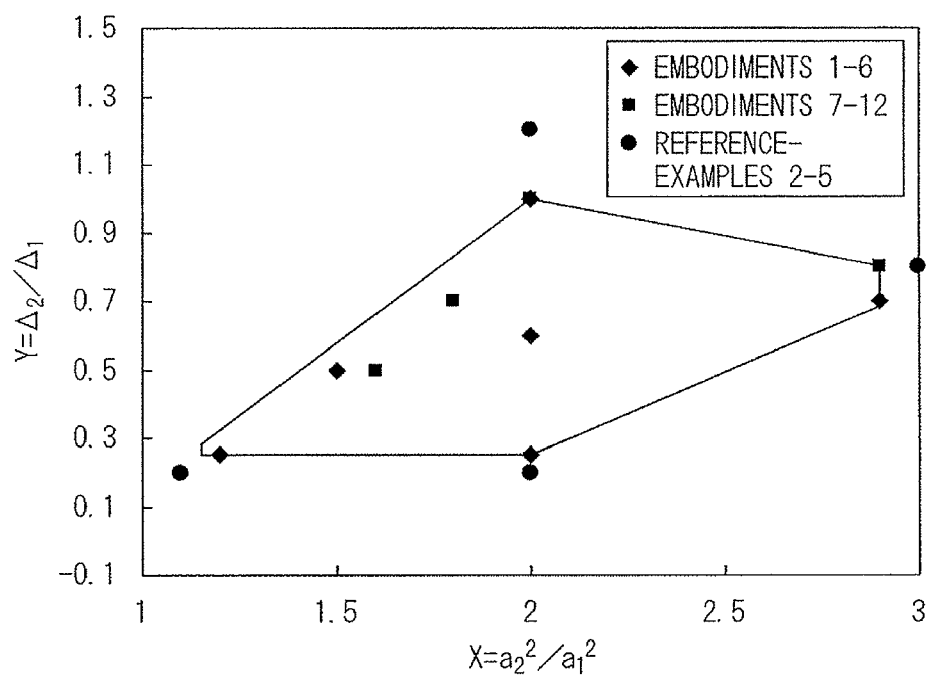
FIG. 2 is a graph which shows a range of the values of X and Y of the optical fiber of the present invention, and which shows the values of X and Y in each of the Examples and Reference Examples.

In order to facilitate understanding of the ranges in which parameters X and Y satisfy the relations of (i) and (ii), boundary lines of the ranges are shown by a narrow solid line in FIG. 2.

When the parameters X and Y satisfy the aforementioned relations of (i) and (ii), the value of Y is within the range of $0.25 \leq Y \leq 1$. When Y is outside this range, the bandwidth value is equal to or less than that of a single-layer core, and the effects sought from a two-layer core are not manifested.

It is more preferable that $Y = 1$. If the parameters X and Y satisfy the aforementioned relations of (i) and (ii), when $X = 2$, then $Y = 1$. Under these circumstances, the maximum value of NA (approximately 1.4 times) is achieved while maintaining bandwidth, thereby enabling obtainment of sufficiently high coupling effect with the light source.

As the machining accuracy required by the connector becomes roughened when coupling efficiency is high, there is the advantage that machining costs are reduced, and the overall system can be inexpensively constructed.

With respect to the optical fiber of the present invention, it is preferable that the relative refractive index difference A between the glass core and the polymer core is set to be 1.2% or less. The bandwidth becomes 20 MHz·km or more by setting $\Delta_1$ within this range, thus enabling obtainment of a sufficiently high bandwidth for a short-range optical fiber.

The diameter $a_1$ of the glass core of the optical fiber of the present invention is set to be 110 μm or more and 200 μm or less. In the case where the glass core diameter $a_1$ is less than 110 μm, there are no particular problems in terms of the properties pertaining to the two-layer core fiber. However, as a single-layer core fiber which has a core diameter with Z that is identical to that of the two-layer core fiber can be designed with a glass core diameter of 200 μm or less, flexural life can be fully assured even with a single-layer core fiber, so that the advantages of a two-layer core cannot be exploited. On the other hand it is undesirable to have the glass core diameter $a_1$ exceed 200 μm, because there is a major lowering of flexural life not only with a single-layer core but also with a two-layer core. If the glass core diameter $a_1$ of the two-layer core fiber is set to be 110 μm or more and 200 μm or less, it is possible to set the glass core diameter within the desired range from the standpoint of flexural life while maintaining a large Z parameter.

It is preferable that the thickness of the polymer core of the optical fiber of the present invention is set to be 10 μm or more. Here, the thickness of the polymer core is defined as $(a_2 - a_1)/2$. In the case where the thickness of the polymer core is less than 10 μm, it is difficult to minutely adjust the eccentricity amount of the polymer core relative to the glass core (to make it concentric) while manufacturing the optical fiber, rendering such manufacture impractical. However, minute adjustment of eccentricity amount becomes easy, and manufacturability is enhanced, by setting the thickness of the polymer core to be 10 μm or more.

With respect to the optical fiber of the present invention, when the diameter of the polymer core is set to be $a_1$, the refractive index of the glass core is set to be $n_1$, the refractive index of the polymer core is set to be $n_2$, and the refractive index of the polymer cladding is set to be $n_3$, the ratio $Z_R = Z_{2core}/Z_{1core}$ of the parameters $Z_{2core}$ and $Z_{1core}$ is within the range of $1.25 \leq Z_R \leq 4$, in which the parameter $Z_{2core}$ defined as $Z_{2core} = a_2^2 \pi/4 \times \sqrt{(n_1^2 - n_3^2)}$ and the parameter $Z_{1core}$ defined as $Z_{1core} = a_1^2 \pi/4 \times \sqrt{(n_1^2 - n_2^2)}$.

When the value of the parameter $Z_R$ is outside the aforementioned range, the advantages of the two-layer core structure are not manifested. When the values of the parameter $Z_R$ is within the aforementioned range as well as the parameters X and Y, it is possible to achieve improvements in breakage probability, NA, and bandwidth.

EXAMPLES

The present invention is described below in detail based on the Examples.

As shown in Table 1, an optical fiber was trial manufactured by making a glass core of silica glass (refractive index $n_1 = 1.457$) with diameter $a_1$, forming a polymer core with diameter $a_2$ around the periphery of the glass core, and further forming a polymer cladding around the periphery of the polymer core. The fluorine addition polymers with respectively adjusted refractive indexes ($n_2$ and $n_3$) were prepared for the polymer core and polymer cladding, and an optical fiber with the desired relative refractive index differences $\Delta_1$ and $\Delta_2$ was obtained. The trial optical fibers are recorded in Examples 1-12 and Reference Examples 1-7, for a total of 19 types.

In FIG. 2, the ranges of the X, Y value of the optical fibers of the present invention are shown by a narrow solid line, and the X, Y values of the respective Examples and Reference Examples are shown by symbols.

The values of the parameters X, Y, and Z were computed, and NA and bandwith were obtained for each of the trial optical fibers obtained in these Examples and Reference Examples.

Furthermore, for purposes of comparison with an optical fiber with a single-layer core structure which has a glass core with refractive index $n_1$ and a polymer core with refractive index $n_2$ and whose relative refractive index difference $\Delta$ is equal to $\Delta_1$, the NA ratio, $Z_R$, single-layer-core design core diameter, bandwidth ratio, estimated breakage probability, and single-layer-core estimated breakage probability were obtained, and evaluation of each optical fiber was conducted. These results are shown in Table 1 and Table 2.

With respect to evaluation of estimated breakage probability, "O" was recorded when the glass core diameter $a_1$ was 200 μm or less, and "X" was recorded when $a_1$ exceeded 200 μm.

TABLE 1

| | $a_1$ (μm) | $a_2$ (μm) | $n_1$ | $n_2$ | $n_3$ | $\Delta_1$ (%) | $\Delta_2$ (%) | $NA_1$ | $NA_2$ | $NA_3$ | NA ratio | X | Y | Z | $Z_R$ |
|---|---|---|---|---|---|---|---|---|---|---|---|---|---|---|---|
| Example 1 | 200 | 283 | 1.457 | 1.439 | 1.429 | 1.2 | 0.69 | 0.23 | 0.17 | 0.28 | 1.25 | 2.0 | 0.6 | 17881 | 2.49 |
| Example 2 | 200 | 219 | 1.457 | 1.439 | 1.435 | 1.2 | 0.28 | 0.23 | 0.11 | 0.25 | 1.10 | 1.2 | 0.23 | 9501 | 1.32 |
| Example 3 | 200 | 283 | 1.457 | 1.439 | 1.435 | 1.2 | 0.28 | 0.23 | 0.11 | 0.25 | 1.10 | 2.0 | 0.23 | 15866 | 2.21 |
| Example 4 | 200 | 341 | 1.457 | 1.439 | 1.427 | 1.2 | 0.83 | 0.23 | 0.19 | 0.29 | 1.29 | 2.9 | 0.7 | 26863 | 3.75 |
| Example 5 | 200 | 283 | 1.457 | 1.439 | 1.422 | 1.2 | 1.2 | 0.23 | 0.22 | 0.32 | 1.39 | 2.0 | 1.0 | 19967 | 2.78 |
| Example 6 | 200 | 245 | 1.457 | 1.439 | 1.431 | 1.2 | 0.55 | 0.23 | 0.15 | 0.27 | 1.20 | 1.5 | 0.5 | 12918 | 1.80 |
| Example 7 | 200 | 283 | 1.457 | 1.445 | 1.434 | 0.8 | 0.76 | 0.19 | 0.18 | 0.26 | 1.38 | 2.0 | 0.9 | 16220 | 2.77 |
| Example 8 | 200 | 283 | 1.457 | 1.436 | 1.416 | 1.4 | 1.4 | 0.25 | 0.24 | 0.34 | 1.39 | 2.0 | 1.0 | 21589 | 2.79 |
| Example 9 | 200 | 268 | 1.457 | 1.413 | 1.383 | 3.0 | 2.10 | 0.36 | 0.29 | 0.46 | 1.29 | 1.8 | 0.7 | 25860 | 2.32 |
| Example 10 | 200 | 253 | 1.457 | 1.413 | 1.391 | 3.0 | 1.54 | 0.36 | 0.25 | 0.43 | 1.22 | 1.6 | 0.5 | 21796 | 1.95 |
| Example 11 | 110 | 187 | 1.457 | 1.413 | 1.378 | 3.0 | 2.45 | 0.36 | 0.31 | 0.47 | 1.33 | 2.9 | 0.8 | 12998 | 3.85 |
| Example 12 | 150 | 255 | 1.457 | 1.413 | 1.378 | 3.0 | 2.45 | 0.23 | 0.31 | 0.47 | 1.33 | 2.9 | 0.8 | 24169 | 3.85 |
| Reference Example 1 | 200 | — | 1.457 | 1.439 | — | 1.2 | — | 0.23 | — | — | — | — | — | — | 1.0 |
| Reference Example 2 | 200 | 210 | 1.457 | 1.439 | 1.436 | 1.2 | 0.21 | 0.23 | 0.09 | 0.25 | 1.08 | 1.1 | 0.2 | 8537 | 1.19 |
| Reference Example 3 | 200 | 283 | 1.457 | 1.439 | 1.436 | 1.2 | 0.21 | 0.23 | 0.09 | 0.25 | 1.08 | 2.0 | 0.2 | 15504 | 2.16 |
| Reference Example 4 | 200 | 346 | 1.457 | 1.439 | 1.426 | 1.2 | 0.90 | 0.23 | 0.19 | 0.30 | 1.31 | 3.0 | 0.7 | 28109 | 3.92 |
| Reference Example 5 | 200 | 283 | 1.457 | 1.439 | 1.419 | 1.2 | 1.38 | 0.23 | 0.24 | 0.33 | 1.45 | 2.0 | 1.1 | 20795 | 2.90 |
| Reference Example 6 | 250 | — | 1.457 | 1.413 | — | 3.0 | — | 0.36 | — | — | — | — | — | — | 1.00 |
| Reference Example 7 | 300 | — | 1.457 | 1.413 | — | 3.0 | — | 0.36 | — | — | — | — | — | — | 1.00 |

TABLE 2

| | Single-layer-core design core diameter (μm) | Bandwidth (MHz · km) | Bandwidth ratio | Estimated breakage probability (O or X) | Single-layer-core estimated breakage probability |
|---|---|---|---|---|---|
| Example 1 | 317 | 24.4 | 1.22 | O | X |
| Example 2 | 231 | 20.8 | 1.04 | O | X |
| Example 3 | 299 | 20.3 | 1.01 | O | X |
| Example 4 | 388 | 20.0 | 1.00 | O | X |
| Example 5 | 335 | 20.1 | 1.00 | O | X |
| Example 6 | 271 | 25.0 | 1.25 | O | X |
| Example 7 | 336 | 30.6 | 1.00 | O | X |
| Example 8 | 335 | 17.3 | 1.00 | O | X |
| Example 9 | 304 | 9.43 | 1.20 | O | X |
| Example 10 | 279 | 9.93 | 1.26 | O | X |
| Example 11 | 216 | 7.88 | 1.00 | O | X |
| Example 12 | 294 | 7.88 | 1.00 | O | X |
| Reference Example 1 | 209 | 20.0 | — | O | O |

TABLE 2-continued

|  | Single-layer-core design core diameter (μm) | Bandwidth (MHz·km) | Bandwidth ratio | Estimated breakage probability (O or X) | Single-layer-core estimated breakage probability |
|---|---|---|---|---|---|
| Reference Example 2 | 219 | 19.0 | 0.95 | O | X |
| Reference Example 3 | 296 | 19.5 | 0.97 | O | X |
| Reference Example 4 | 400 | 19.8 | 0.99 | O | X |
| Reference Example 5 | 343 | 17.6 | 0.88 | O | X |
| Reference Example 6 | 230 | 7.88 | — | X | X |
| Reference Example 7 | 300 | 7.88 | — | X | X |

Here, the NA ratio, $Z_R$, and bandwidth ratio signify the ratios of NA, Z, and bandwidth which are obtained from the single-layer core fiber (in other words, these are the ratios expressed by (value of the two-layer core fiber)/(value of the single-layer core fiber)). In which, the glass core diameter and the refractive index of the single-layer core fiber are equal to the glass core diameter $a_1$ and refractive index $n_1$ of the two-layer core fiber, and the polymer cladding of the single-layer core fiber has a refractive index equal to the refractive index $n_2$ of the polymer core of the two-layer core fiber (the relative refractive index difference Δ of the single-layer core fiber is equal to $\Delta_1$ of the two-layer core fiber). The value of these ratios greater than 1 indicates that the two-layer core fiber is superior to the single-layer core fiber.

The single-layer-core design core diameter signifies the glass core diameter of the single-layer core fiber, in which the glass core diameter is designed with modifications so that the value of parameter Z is equal to that value of the two-layer core fiber. In which the glass core refractive index of the single-layer core fiber is equal to the glass core refractive index $n_1$ of the two-layer core fiber, and the polymer cladding of the single-layer core fiber has a refractive index equal to the refractive index $n_2$ of the polymer core of the two-layer core fiber (the relative refractive index difference Δ of the single-layer core fiber is equal to $\Delta_1$ of the two-layer core fiber).

Moreover, the single-layer-core estimated breakage probability is estimated breakage probability obtained from the single-layer core fiber having the aforementioned single-layer-core design core diameter. The evaluation of the single-layer-core estimated breakage probability was conducted such that "O" was recorded when the single-layer-core design core diameter was 200 μm or less, and "X" was recorded when the single-layer-core design core diameter exceeded 200 μm.

The detailed results are described as follows.

Examples 1-6 are related to the two-layer core fibers, and the glass core diameter $a_1$ of the two-layer core fiber is set at 200 μm and $\Delta_1$ is set at 1.2%, and the polymer core diameter $a_2$ and $\Delta_2$ are selected so that the values of X, Y, and $Z_R$ fall within the prescribed ranges. The NA ratio of these two-layer core fibers is 1.10-1.39, $Z_R$ of these two-layer core fibers is 1.32-3.75, and bandwidth ratio of these two-layer core fibers is also 1-1.22, thereby these two-layer core fibers demonstrating superiority in comparison to the single-layer core fiber.

On the other hand, Reference Example 1 is related to a single-layer core fiber, in which the glass core diameter $a_1$ of the single-layer core fiber is set at 200 μm and $\Delta_1$ is set at 1.2%. The Reference Examples 2-5 are related to a two-layer core fibers, in which the glass core diameter $a_1$ of the two-layer core fibers is set at 200 μm and $\Delta_1$ is set at 1.2%, and the polymer core diameter $a_2$ and $\Delta_2$ are selected so that the values of X and Y do not fall within the prescribed ranges. Since the Reference Example 1 is related to a single-layer core fiber, the NA ratio, $Z_R$, and bandwidth ratio are each 1. Moreover, in the two-layer core fibers of reference examples 2-5, the NA ratio and $Z_R$ are 1 or more, but the bandwidth ratio is less than 1, thereby demonstrating that the bandwidth becomes smaller in comparison to the single-layer core fiber.

From the foregoing, one may say that when the values of parameters X, Y, and $Z_R$ are not within the specified range of the present invention, the advantages of a two-layer core structure are not obtained. Moreover, it is clear that when the values of parameters X, Y, and $Z_R$ are within the specified range of the present invention, there is improvement in breakage probability, NA and bandwidth.

Next, a description is given of Examples 5, 7, and 8 wherein Δ alone is varied, and the values of X and Y are unchanged. As Y=1, $\Delta_1=\Delta_2$ exists in all cases, and set to be 1.2% in Example 5, 0.8% in Example 7, and 1.4% in Example 8. The NA ratio, $Z_R$, and bandwidth ratio are 1 or more in all cases of these three Examples. In contrast to the Examples 5 and 7 where bandwidth is 20 MHz·km or more, and constituting wide-bandwidth optical fiber, the bandwidth of Example 8 is less than 20 MHz·km. From these findings, it is clear that when $\Delta_1$ is set to be 1.2% or less, bandwidth is wide, and better properties are exhibited.

When comparing the Y values of Examples 1-6, it is found that in Example 5 where Y=1, as $\Delta_1=\Delta_2$, NA is highest compared to the cases where Y<1, with the result that the NA ratio is highest.

Furthermore, when comparing the X value of Examples 9 and 10, it is found that $Z_R$ is 2 or more in Example 9 where X=1.8, but the Z ratio is less than 2 in Example 10 where X=1.6. From these findings, it is clear that if X is set to be 1.8 or more, $Z_R$ is 2 or more, and the advantages of the two-layer core structure are fully manifested.

Furthermore, in the Examples 11 and 12 where the glass core diameter $a_1$ is small, it is a matter of course that the NA ratio, $Z_R$, and bandwidth ratio are 1 or more, because a two-layer core structure is used. In the case of the single-layer-core design core diameter, according to Example 11, the glass core diameter is 110 μm in a two-layer core structure, in contrast, a glass core diameter of 216 μm would be required in a single-layer core structure that obtains an identical Z value. In this case, the breakage probability of optical fiber relative to bending decreases in a single-layer core structure. In short, in a two-layer core structure, reliability is fully obtained even with a small bending radius, but in a single-layer core structure, the probability of breakage increases when bending radius is reduced, and use with a reduced bending radius is not possible, thereby which is undesirable from the standpoint of flexural resistance. The same findings are exhibited by Reference Examples 6 and 7 as well as the other Examples.

As described above, it was found that if the glass core diameter $a_1$ of the two-layer core fiber is set to be 110 μm or more and 200 μm or less, it is possible to obtain an optical fiber of high reliability with sufficiently superior flexural resistance compared to a single-layer core fiber having an identical Z. In addition, it was found that it is possible to obtain an optical fiber which is superior to a single-layer core fiber in terms of NA, Z, and bandwidth, by setting parameters X, Y, and $Z_R$ within the specified ranges of the present invention.

Furthermore, it was found that bandwidth is widened and better properties are obtained by setting $\Delta_1$ to 1.2% or less.

Furthermore, it is possible that $Z_R$ is doubled or more than doubled, and the advantages of the two-layer core structure are fully manifested, by setting the value of X to 1.8 or more.

Furthermore, it is possible to maximize NA, and further enhance light-source coupling efficiency by setting Y=1.

INDUSTRIAL APPLICABILITY

The optical fiber of the present invention may be suitably used in particular as optical fiber for use in short-range optical communications such as home LAN, office LAN, and vehicle-mounted communication systems.

The invention claimed is:

1. A plastic glass optical fiber comprising:
   a glass core composed of glass;
   a polymer core composed of fluorine addition polymer, which is disposed around a periphery of the glass core, and has a refractive index lower than a refractive index of the glass core; and
   a polymer cladding composed of polymer, which is disposed around a periphery of the polymer core, and has a refractive index lower than the refractive index of the polymer core,
   wherein the plastic glass optical fiber satisfies following relations:
   a diameter $a_1$ of the glass core is within a range between 110 μm or more and 200 μm or less, and when the diameter of the glass core is set to be $a_1$ and a diameter of the polymer core is set to be $a_2$, a parameter X defined as $X=a_2^2/a_1^2$ is within a range of $1.8 \leq X \leq 2.9$;
   when a relative refractive index difference between the glass core and the polymer core is set to be $\Delta_1$ and a relative refractive index difference between the polymer core and the polymer cladding is set to be $\Delta_2$, a parameter Y defined as $Y=\Delta_2/\Delta_1$ is within range of $0.25 \leq Y \leq 0.84X-0.68$ when the parameter X is within a range of $1.8 \leq X \leq 2$, and the parameter Y is within a range of $0.48X-0.71 \leq Y \leq -(2/9)X+13/9$ when the parameter X is within range of $2 \leq X \leq 2.9$; and
   When the diameter of the polymer core is set to be a2, the refractive index of the glass core is set to be $n_1$, the refractive index of the polymer core is set to be $n_2$, and the refractive index of the polymer cladding is set to be $n_3$, a ratio $Z_R=Z_{2core}/Z_{1core}$ of parameters $Z_{2core}$ and $Z_{1core}$ is within a range of $1.25 \leq Z_R \leq 4$, in which the parameter $Z_{2core}$ is defined as $Z_{2core}=a_2^2\pi/4X\sqrt{(n_1^2-n_3^2)}$ and the parameter $Z_{1core}$ is defined as $Z_{1core}=a_1^2 4X\sqrt{(n_1^2-n_2^2)}$.

2. The plastic glass optical fiber according to claim 1, wherein the relative refractive index difference $\Delta_1$ between the glass core and the polymer core is 1.2% or less.

3. The plastic glass optical fiber according to claim 2, wherein parameter Y is equal to 1.

4. The plastic glass optical fiber according to claim 3, wherein a thickness of the polymer core defined as $(a_2-a_1)/2$ is 10 μm or more.

5. The plastic glass optical fiber according to claim 2, wherein a thickness of the polymer core defined as $(a_2-a_1)/2$ is 10 μm or more.

6. The plastic glass optical fiber according to claim 1, wherein the parameter Y is equal to 1.

7. The plastic glass optical fiber according to claim 6, wherein a thickness of the polymer core defined as $(a_2-a_1)/2$ is 10 μm or more.

8. The plastic glass optical fiber according to claim 1, wherein a thickness of the polymer core defined as $(a_2-a_1)/2$ is 10 μm or more.

* * * * *